US006217469B1

(12) United States Patent
Sawada et al.

(10) Patent No.: US 6,217,469 B1
(45) Date of Patent: Apr. 17, 2001

(54) CONTROL SYSTEM FOR CONTINUOUSLY VARIABLE TRANSMISSION

(75) Inventors: Makoto Sawada; Hirofumi Okahara, both of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/116,543

(22) Filed: Jul. 16, 1998

(30) Foreign Application Priority Data

Jul. 16, 1997 (JP) ........................ 9-191263

(51) Int. Cl.[7] ........................ F16H 11/06

(52) U.S. Cl. ........................ 474/28; 477/49; 477/45; 477/18; 477/13; 474/18; 474/13

(58) Field of Search ........................ 474/18, 28, 13; 477/45, 49, 46, 48; 701/51, 53, 54

(56) References Cited

U.S. PATENT DOCUMENTS 4,857,034 * 8/1989 Kouno et al. ........................ 477/45 X
5,157,992 * 10/1992 Hayashi et al. ........................ 477/45 X
5,203,233 * 4/1993 Hattori et al. ........................ 477/45
5,337,628 * 8/1994 Hendriks et al. ........................ 477/48
5,458,540 * 10/1995 Moan et al. ........................ 474/28
5,514,047 * 5/1996 Tibbles et al. ........................ 477/46
5,697,866 12/1997 Okahara .

FOREIGN PATENT DOCUMENTS 8-74959 3/1996 (JP) .
8-200461 8/1996 (JP) .

* cited by examiner

*Primary Examiner*—Dirk Wright
*Assistant Examiner*—Peter T. Kwon
(74) *Attorney, Agent, or Firm*—Foley & Lardner

(57) ABSTRACT

A control system controls a line pressure applied to a CVT upon taking account of a certrifugal pressure caused by a rotation of pulleys. The control system determines whether the centrifugal pressure is greater than a predeterminied value only by which the pulley transmits an input torque from an engine. When the determination is affirmative, a lower limit of a duty ratio for operating a line pressure control valve is switched from a lower limit of a linear range to 0% duty ratio. Therefore, an actual transmissiou ratio control range is expanded while preventing an undershoot of the line pressure.

13 Claims, 9 Drawing Sheets

CONTROL SYSTEM FOR CONTINUOUSLY VARIABLE TRANSMISSION

BACKGROUND OF THE INVENTION

The present invention relates to improvements in a control system of a continuously variable transmission (CVT) for a vehicle, and more particularly to a control system of a belt type CVT.

A Japanese Patent Provisional Publication No. 8-74959 discloses a line pressure control system for a belt type CVT. The conventional line pressure control system is arranged to control a duty valve by outputting a duty ratio indicative signal as a command value to the duty valve in order to control a belt holding force of the pulley of the CVT. The command value to the duty valve is limited within a range except dead zones so as to ensure the responsibility of the line pressure applied to the CVT.

SUMMARY OF THE INVENTION

However, if a limit value of the command value is simply set at a boundary value of the dead zone, the output pressure of the duty valve tends to fluctuate though the responsibility of the line pressure control is maintained. On the other hand, higher the rotation speed of the pulleys of the belt type CVT becomes, higher a centrifugal pressure of the working fluid in the pulleys becomes. When the rotation speed of the pulley becomes greater than a predetermined value, the belt is held by the centrifugal pressure through the pulley regardless the line pressure so as to prevent a shift control and a line pressure control from being accurately executed in such a centrifugal pressure dominant range. Therefore, it is necessary to omit the centrifugal pressure dominant range from a transmission ratio control range. Further, it is necessary to extend the centrifugal pressure dominant range upon taking account of the dispersion caused by the fluctuation of the output pressure. As a result, the transmission ratio control range is decreased by the margin for the dispersion due to the characteristic of the duty valve.

It is therefore an object of the present invention to provide a CVT control system which extends the controllable range of a CVT transmission ratio without degrading the responsibility of a line pressure for controlling the CVT.

A control system according to the present invention comprises a continuously variable transmission (CVT), a CVT pressure control valve, a centrifugal pressure detecting means, a centrifugal pressure deciding means, and a limit value switching means. The CVT comprises a driver pulley, a follower pulley and a belt intercoupling the pulleys. The CVT varies a transmission ratio by changing effective diameters of the pulleys. The CVT pressure control valve controls a pressure of working fluid to be supplied to the CVT according to a command signal. The centrifugal pressure detecting means detects a centrifugal pressure of the working fluid in the pulley. The centrifugal pressure deciding means decides that the centrifugal pressure is in a centrifugal pressure dominant range in which motive power is transmitted only by the centrifugal pressure. The limit value switching means switches a limit value of the command signal from a high response value to a high stability value when the centrifugal pressure detecting means detects the centrifugal pressure dominant range.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 11, there is shown an embodiment of a control system of a continuously variable transmission (CVT) in accordance with the present invention.

Figure 1:
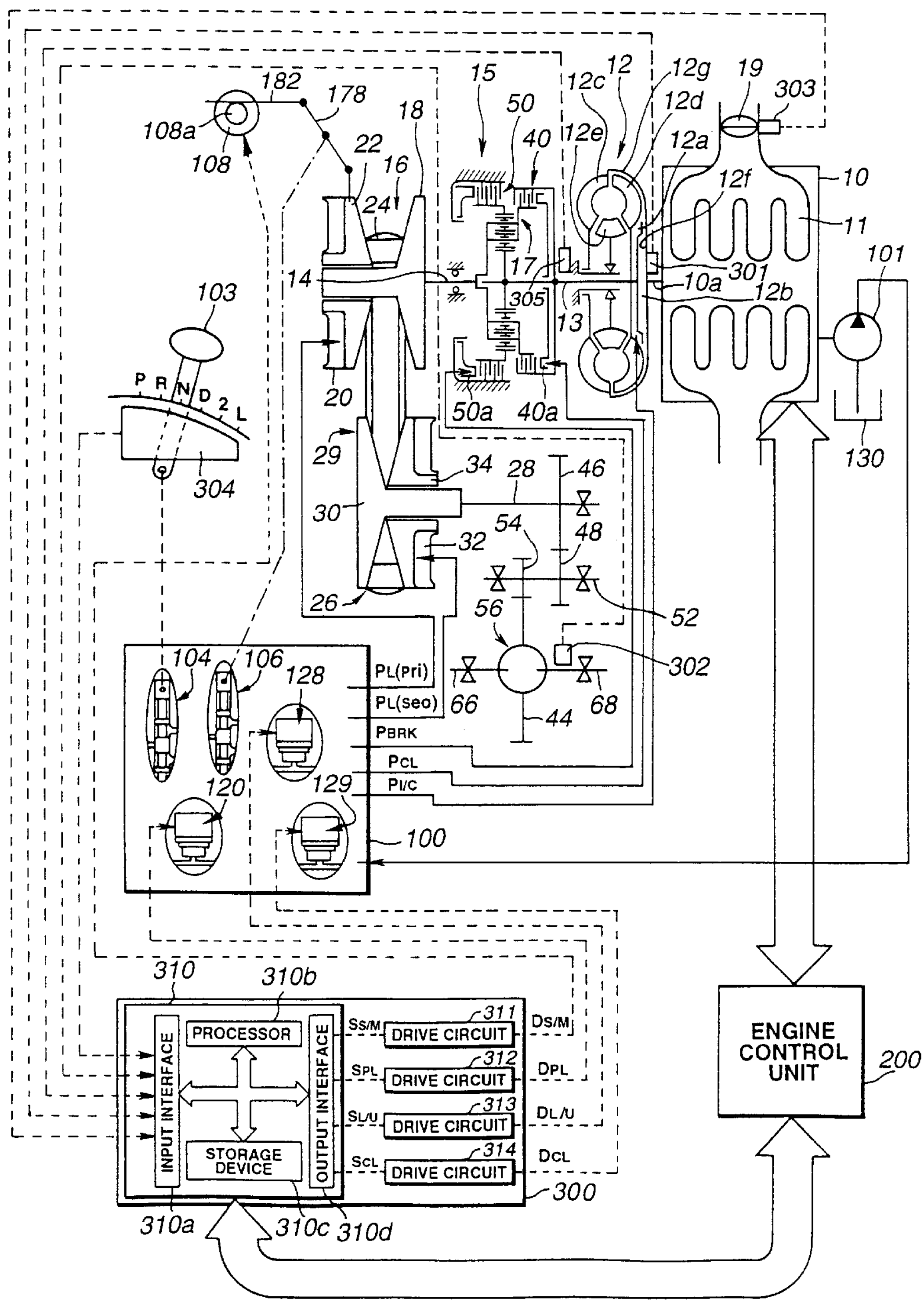
FIG. 1 is a schematic view showing a CVT and a control system thereof according to an embodinment of the present invention.

FIG. 1 shows an embodiment of the CVT and the control system thereof according to the present invention. A power transmission mechanism of the CVT is basically the same as that of a power transmission mechanism disclosed in a U.S. Pat. No. 5,697,866 except that a torque converter 12 is employed instead of a fluid coupling. Therefore, the same parts and elements of the power transmission mechanism are designated by same reference numerals, and only a brief explanation thereof will be given hereinafter.

As shown In FIG. 1, an engine 10 is connected to a V-belt type CVT mechanism 29 through the torque converter 12 and a forward/reverse change over mechanism 15. An output shaft of the CVT mechanism 29 is connected to a differential unit 56. These elements 10, 12, 29 and 56 constitute a so-called drive system. The drive system transmits rotation of an output shaft 10*a* of the engine 10 to right and left drive shaft 66 and 68 at a selected speed ratio in a selected rotational direction to drive a vehicle.

A throttle valve 19 is disposed in an air intake passage 11 of the engine 10 and is arranged to change a degree of its opening in response to a depression degree of an accelerator pedal (no numeral). A throttle opening sensor 303 is installed to the throttle valve 19 to detect a throttle opening TVO of the throttle valve 19 and to output a signal indicative of the throttle opening TVO. An engine revolution speed sensor 301 is installed on the output shaft 10*a* of the engine 10 to detect an engine revolution speed $N_E$ and to output a signal indicative of the engine revolution speed $N_E$.

The engine 10 is connected to an engine control unit 200 by which various engine operation factors such as fuel injection amount and timing and ignition timing are controlled so as to put the engine 10 in an optimum operating condition according to the running condition of the vehicle and a driver's intent.

The throttle opening indicative signal TVO outputted from the throttle opening sensor 303 also corresponds to the magnitude of the depression degree of the accelerator pedal. Although the engine revolution speed sensor 301 is arranged to detect the rotation speed of the output shaft 10*a* of the engine 10 in this embodiment, it will be understood that it may be arranged to count the number of ignition pulses of the engine 10 as an engine revolution speed.

The torque converter 12 of this drive system is a lockup torque converter of a known type. This lockup torque converter 12 comprises a pump impeller (input member) 12*c*, a turbine runner or turbine (output member) 12*d*, a stator 12*e*, and a lockup facing member (or lockup clutch) 12*f* for providing a direct mechanical drive by directly coupling the input and output members 12*c* and 12*d*. The lockup facing member 12*f* is connected with an output shaft (turbine shaft) 13. The lockup facing member 12*d* separates an apply side fluid chamber 12*a* and a release side fluid chamber 12*b*. The release chamber 12*b* is formed between a cover 12*g* of a torque converter 12 and the lockup facing member 12*f*, and the apply chamber 12*a* is disposed on the opposite side of the lockup facing member 12*f*. When a fluid pressure is supplied into the apply chamber 12*a*, the lockup facing member 12*f* is pressed against the cover 12*g*, and the torque converter 12 is put in a lockup state in which the input member 12*c* and the output member 12*d* are directly connected. When the fluid is supplied sufficiently into the release chamber 12*b*, the lockup facing member 12*f* is disengaged from the cover 12*g*, and the torque converter 12 is held in a non-lockup state (or unlockup state). The fluid pressure supplied to the release chamber 12*b* is drained through the apply chamber 12*a*.

An input rotation speed sensor 305 is installed on an output shaft 13 (turbine output shaft) of the torque converter 12 in order to detect an input rotation speed of the CVT mechanism 29.

When the vehicle is put in a normal running condition, the forward clutch 40 is put in a full engagement state. Therefore, the rotation speed of the turbine output shaft 13 is used as an input rotation speed $N_{Pri}$ of the CVT mechanism 29. When a foot of a driver is released from the accelerator pedal, the forward/reverse change over mechanism 15 functions to control a creep running force by variably adjusting the engagement force of the forward crutch 40. The fluid supplied to the release chamber 12*b* is drained through the apply chamber 12*a* to a reservoir 130, and a drained fluid of the fluid supplied to the apply chamber 12*c* is supplied from the release chamber 12*b* to other cooling and lubricating systems. That is, the switching control between the lockup state and the unlockup state is executed by changing a flow direction of the fluid supplied to the lockup mechanism of the torque converter 12 as mentioned above without changing the fluid passage.

The forward/reverse drive direction change over mechanism 15 comprises a planetary gear system 17, the forward clutch 40 and a reverse brake 50. The planetary gear system 17 comprises multistage pinion trains and a pinion carrier supporting these pinion trains. The pinion carrier is connected to the driver pulley 16 of the CVT mechanism 29 through the driver pulley shaft 14, and a sun gear is connected to the turbine rotation shaft 13, The pinion carrier is engageable with the turbine rotation shaft 13 by means of the forward clutch 40. A ring gear of the planetary gear system 17 is engageable with a stationary housing by means of the reverse brake 50.

The reverse brake 50 is disposed between a ring gear of the planetary gear system 17 and a stationary housing to hold the ring gear. When the forward clutch 40 is put in the engaged state by the supply of the fluid pressure to a fluid chamber 40*a*, the driver pulley shaft 14 and the turbine output shaft 13 are rotated in the same direction with equal speed through a pinion carrier. When the reverse brake 50 is engaged by the supply of the fluid pressure to the fluid chamber 50*a*, the driver pulley shaft 14 and the turbine output shaft 13 are rotated with equal speed but in the opposite direction.

The V-belt CVT mechanism 29 comprises a driver pulley 16, a follower (or driven) pulley 26, and a V-belt 24 for transmitting power between the pulleys. The driver pulley 16 is mounted on the driver pulley shaft 14. The driver pulley 16 comprises an axially stationary fixed conical disk 18, and an axially movable conical disk 22, which confront each other and define a V-shaped pulley groove therebetween for receiving the V-belt 24. The fixed disk 18 rotates as a unit with the driver shaft 14. By a fluid pressure in a driver pulley cylinder chamber 20, the movable disk 22 is axially movable.

The follower pulley 26 is mounted on a follower pulley shaft 28. The follower pulley 26 comprises an axially stationary fixed conical disk 30, a follower pulley cylinder chamber 32, and an axially movable conical disk 34. The fixed and movable disks 30 and 34 confront each other and define a V-shaped pulley groove for receiving the V belt 24. The fixed disk 30 rotates as a unit with the follower shaft 28. The movable disk 34 is axially movable in dependence on a fluid pressure in the follower pulley cylinder chamber 32.

The V-belt CVT mechanism 29 further comprises a stepping motor 108 controlled by a transmission control unit 300. A pinion 108*a* is connected to a rotation shaft of the stepping motor 108 and is meshed with a rack 182. An end of the rack 182 and the movable conical disk 22 are interconnected through a lever 178. By the operation of the stepping motor 108 according to the drive signal $D_{S/M}$ from the transmission control unit 300, the movable conical disk 22 of the driver pulley 16 and the movable conical disk 34 of the follower pulley 26 are axially moved to vary the effective radius of the contact position of each pulley of the driver and follower pulleys 16 and 26 axially. By so doing, the CVT mechanism 29 can vary the speed ratio (transmission ratio or pulley ratio) between the driver pulley 16 and the follower pulley 26.

The shift control system (pulley ratio varying control) is generally arranged to vary the pulley groove width of one of the driver and follower pulleys and allow the groove width of the other to be adjusted automatically. This arrangement is achieved by the belt of a push type which transmits the driving force mainly in the pushing direction, The push type V-belt 24 comprises a set of plates which are overlappingly arranged in the longitudinal direction or wound direction of the belt.

A drive gear 46 fixed to the follower pulley shaft 28 is meshed with an idler gear 48 formed on an idler shaft 52. A pinion gear 54 formed on the idler shaft 52 is meshed with a final gear 44 with which right and left drive shafts 66 and 68 are interconnected through the differential unit 56. A vehicle speed sensor 302 is installed on this final output shaft to detect a vehicle speed $V_{SP}$ and output a signal indicative of the vehicle speed $V_{SP}$ to the transmission control unit 300.

Next, a construction of a hydraulic pressure control apparatus of the CVT will be discussed. The hydraulic pressure control apparatus comprises a pump 101 driven by the engine 10. The pump 101 draws a working fluid from a reservoir 130 and supplies the fluid to an actuator unit 100 while applying a sufficient pressure to the fluid. The construction of the actuator unit 100 is basically the same as that of the actuator unit disclosed in a U.S. Pat. No. 5,697,866. Therefore, the same parts and elements are designated by same reference numerals, and only a brief explanation thereof will be given hereinafter.

A manual valve 104 is directly operated by a selector lever 103 so as to switchingly control a clutch pressure $P_{CL}$ to a cylinder chamber 40*a* of the forward clutch 40 and a brake pressure, $P_{BRK}$ to a cylinder chamber 50*a* of the reverse brake 50.

An inhibitor switch 304 installed on the selector lever 103 detects a shift position selected by the selector lever 103 and outputs a shift range signal $S_{RANGE}$ indicative of the selected shift position. More particularly, the shift range signal $S_{RANGE}$ includes signals corresponding to P, R, N, D, 2, L according to the actually selected shift position.

A shift control valve 106 lis controlled according to a relative displacement between the stepping motor 10 and the movable conical disk 22 of the driver pulley 16, more particularly it is controlled according to the movement of the lever 178. That is, the shift control valve 106 controls the fluid pressure (line pressure) $P_{L(Pri)}$ supplied to the driver pulley 16 according to a relative relationship between the required transmission ratio and a groove width of the driver pulley 16.

A lockup control duty valve 128 controls a lockup mechanism of the torque converter 12 so as to to put the torque converter 12 in one of a lockup state and an unlockup state. A transmnission control unit 300 outputs a drive signal $D_{L/U}$ to the lockup control valve 128 to operate the lockup mechanism of the torque converter 12. More particularly, when the drive signal $D_{L/U}$ indicative a large duty ratio is outputted to the lockup control duty valve 128, the torque converter 12 is put in the lockup state. When the drive signal $D_{L/U}$ indicative of a small duty ratio is outputted to the lockup control valve, 128, the torque converter 12 is put in the unlockup (non-lockup) state.

A clutch engagement duty valve 129 controls an engagement force for one of the forward clutch 40 and the reverse brake 50 according to a drive signal $D_{CL}$ from the transmission control unit 300. When the drive signal $D_{CL}$ indicates a large duty ratio, one of the forward clutch 40 and the reverse brake 50 is engaged. When the drive signal $D_{CL}$ indicates a small duty ratio, it is disengaged.

A line pressure control duty valve 120 controls the line pressure $P_L$ supplied mainly to the follower pulley 26 and partly to the driver pulley 16 so as to hold the belt 24 by the pulleys 26, 16 according to a drive signal $D_{PL}$ from the transmission control unit 300. This duty valve 120 is represented as a modifier duty valve in the above cited Patent document. The reason for this is the output pressure from the duty valve 120 once functions as a pilot pressure of a pilot pressure control valve named as a pressure modifier valve. As a result, an output pressure from the pressure modifier valve functions as a pilot pressure of the line pressure control valve so as to control the line pressure $P_L$ produced in an upstream side of the line pressure control valve. That is, by controlling the duty ratio of the duty valve 120, the line pressure $P_L$ is indirectly controlled. $P_{L(0R)}$ is linearly increased according to the increase of the control signal (command value) to the line pressure control duty valve 120 or duty ratio $D/T_{PL}$ of the drive signal except for predetermined dead zones shown in FIG. 2. More particularly, a lower dead zone of FIG. 2 ranges from a minimum value $D/T_{PL\text{-}MIN0}$ (=0%) of the line pressure duty ratio $D/T_{PL}$ to a lower dead zone threshold $D/T_{PL\text{-}MIN1}$, and an upper dead zone of FIG. 2 ranges from an upper dead zone threshold $D/T_{PL\text{-}MAX1}$ to a maximum value $D/T_{PL\text{-}MAX0}$ (100%). Therefore, a linear operation zone ranges from the lower dead zone threshold $D/T_{PL\text{-}MIN1}$ to the upper dead zone threshold $D/T_{PL\text{-}MAX1}$. Accordingly, when the output pressure of the pressure modifier valve is increased, the base (original) pressure of the clutch pressure and the base pressure of the lockup) pressure of the torque converter 12 are simultaneously increased although the gradients and intercepts thereof are different respectively from others.

The transmission control unit 300 comprises a microcomputer 310 functioning as a control means, and four drive circuits 311 to 314. The microcomputer 310 outputs control signals for controlling the CVT mechanism 29 and the actuator unit 100 by executing a process shown by a flowchart of FIG. 3. The first to fourth drive circuits 311 to 314 respectively convert the control signals outputted from the microcomputer 310 into drive signals for practically controlling the actuators such as the stepping motor 108 and the respective duty valves 120, 128 and 129.

The microcomputer 310 comprises an input interface circuit 310*a* including an A/D converter, a calculation processor 310*b* such as a microprocessor, a storage device 310*c* such as ROM and RAM, and an output interface circuit 310*d* including a D/A converter.

The microcomputer 310 executes various operations such as obtaining a rotation angle of the stepping motor 108 for setting the actual transmission ratio, outputting a pulse signal $S_{S/M}$ for achieving the rotation angle, obtaining the optimum line pressure for holding the belt 24, calculating the duty ratio $D/T_{PL}$ of the line pressure control duty valve 120 for achieving the necessary line pressure $P_L$, obtaining the fluid pressure (torque converter pressure) $P_{T/C}$ for controlling the lockup mechanism of the torque converter 12, calculating the duty ratio $D/T_{L/U}$ of the lockup control duty valve 128 for achieving the torque converter pressure $P_{T/C}$, outputting a lockup control signal $S_{L/U}$ according to the lockup control duty ratio $D/T_{L/U}$, obtaining the fluid pressure (clutch pressure) $P_{CL}$ which is optimum to extecute a creep running of the vehicle under when the accelerator pedal is put in the off condition (a foot of an operator is released from the accelerator pedal), calculating a duty ratio $D/T_{CL}$ of the clutch engagement control duty valve 129 necessary for achieving the required clutch pressure $P_{CL}$, outputting a clutch engagement control signal $S_{CL}$ according to the clutch pressure control duty ratio $D/T_{CL}$, and so on.

The first drive circuit 311 converts the pulse control signal $S_{S/M}$ into a drive signal $D_{S/M}$ and outputs it to the stepping motor 108. The second drive circuit 312 converts the pulse control signal $S_{PL}$ into a drive signal $D_{PL}$ and outputs it to the line pressure control duty valve 120. The third drive circuit 313 converts the pulse control signal $S_{L/U}$ into a drive signal $D_{L/U}$ and outputs it to the lockup control duty valve 128. The fourth drive circuit 314 converts the pulse control signal $S_{CL}$ into a drive signal $D_{CL}$ and outputs it to the clutch engagement control duty valve 129. If the control signals according to the duty ratio and the pulse control signals satisfactorily indicate the desired duty ratios and number of pulses, the drive circuits 311 to 314 simply execute the amplifications thereof.

The engine control unit 200 also comprises a microcomputer which is interconnected with the microcomputer 310 of the transmission control unit 300 such that the engine 10 and the CVT are controlled according to the vehicle running condition.

The transmission control of the present embodiment will be discussed with reference to a calculating process shown by a flowchart of FIG. 3 which is executed by the microcomputer 310. This calculating process is basically executed when the D-range is selected and when the engine control unit 200 requires no process to the transmission control unit 300.

Herein, a general flow of the shift control will be discussed. This calculating process is impletmented as a timer interruption process at predetermined sampling time $\Delta T$ such as 10 milliseconds (msec). Although the flowchart of FIG. 3 does not show a step for a communication with others, the transmission control unit 300 timely executes a process for reading programs, maps and data used in the processor 310*b* from the storage device 310*c* and properly updates data calculated at the processor 310*b* and stores it in the storage device 310*c*.

At a step S1, the microcomputer 310 reads the signals indicative of the vehicle speed $V_{SP}$ outputted from the vehicle speed sensor 302, the engine revolution speed $N_E$ outputted from the engine revolution sensor 301, the input rotation speed $N_{Pri}$ outputted from the input rotation speed sensor 305, a throttle opening TVO outputted from the throttle opening sensor 303 and a shift range signal $S_{RANGE}$ form the inhibitor switch 304.

At a step S2, the microcomputer 310 calculates a present transmission ratio C, according to the vehicle speed $V_{SP}$ and the input rotation speed $N_{Pri}$ by executing an independently provided process (subroutine). More particularly, the output rotation speed $N_{Sec}$ of the CVT mechanism 29 is obtained by dividing the vehicle speed $V_{SP}$ in proportion with the final output shaft rotation speed by a final reduction speed ratio n ($N_{Sec}=V_{SP}/n$), and the present transmission ratio $C_P$ is obtained by dividing the input rotation speed $N_{Pri}$ by the obtained output rotation speed $N_{Sec}$ ($C_P=N_{Pri}/N_{Sec}$).

At a step S3, the microcomputer 310 calculates the engine torque $T_E$ on the basis of the throttle opening TVO and the engine revolution speed $N_E$ by executing an independently provided process (subroutine) such as a retrieval of a control map. More particularly, the present engine torque $T_E$ is obtained from the output characteristic map shown in FIG. 4 according to the throttle opening TVO and the engine revolution speed $N_E$.

Figure 7:
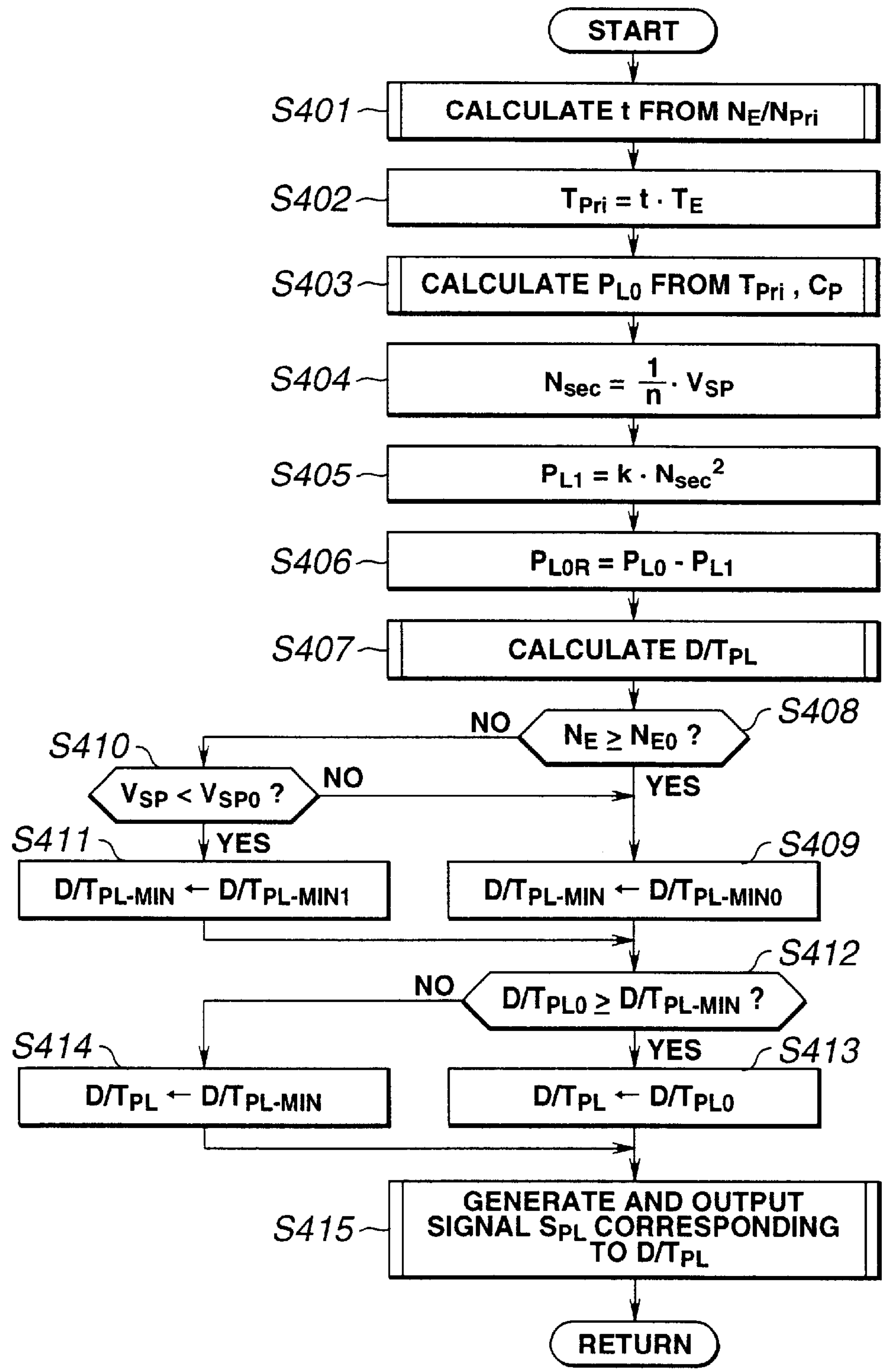
FIG. 7 is a flowchart showing a program for executing a step 4 of FIG. 3.
Figure 8:
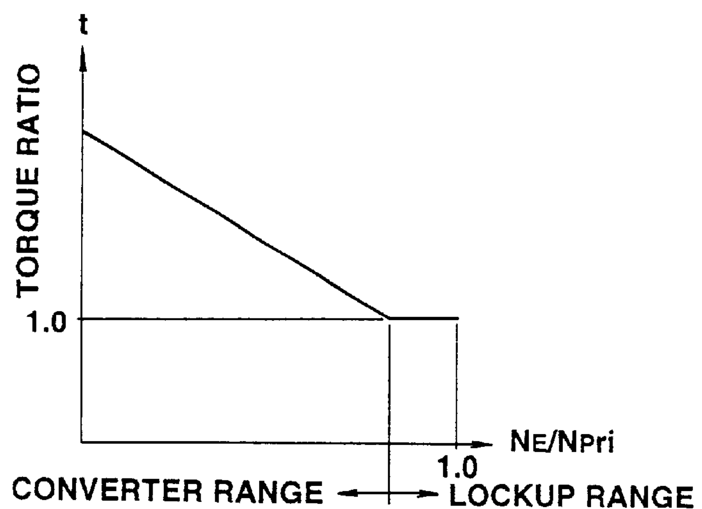
FIG. 8 is a graph showing a control map for setting a torque ratio from the torque converter input and output speed ratio.

At a step S4, the microcomputer 310 exacutes the control of the line pressure $P_L$ according to the process shown by a flowchart of FIG. 7. The detailed explanation of this line pressure control will be done later with reference to the flowchart of FIG. 7.

At a step S5, the microcomputer 310 executes a lockup control by jumping the routine to an independently provided process (subroutine). More particularly, a lockup speed $V_{ON}$ and am unlockup speed $V_{OFF}$ are determined by using a control map shown in FIG. 5 according to the vehicle speed $V_{SP}$ and the throttle opening TVO. Basically, when the vehicle speed $V_{SP}$ is greater than the lockup speed $V_{ON}$, the microcomputer 310 generates and outputs the control signal $S_{L/U}$ including a lockup command for putting the torque converter 12 into the lockup state. When smaller than the unlockup speed $V_{OFF}$, the microcomputer 310 generates and outputs the control signal $S_{L/U}$ including an unlockup command for putting the torque converter 12 into the unlockup state. In particular, in case that the condition of the torque converter 12 is changed from the unlockup state to the lockup state, when a difference between the engine rotation speed $N_E$ and the input rotation speed $N_{Pri}$ is greater than a predetermined value, that is, when a difference between the engine revolution speed $N_E$ and the rotation speed of the turbine of the torque converter 12 is greater than the predetermined value, a gain employed for increasing the duty ratio $D/T_{L/U}$ is increased according to the magnitude of the difference. When the difference is smaller than a predetermined value, that is, when the torque converter 12 tends to be put in the lockup state, the gain for increasing the duty ratio $D/T_{L/U}$ is decreased so as to buffer shift shocks caused by the transition to the full lockup state.

Figure 6:
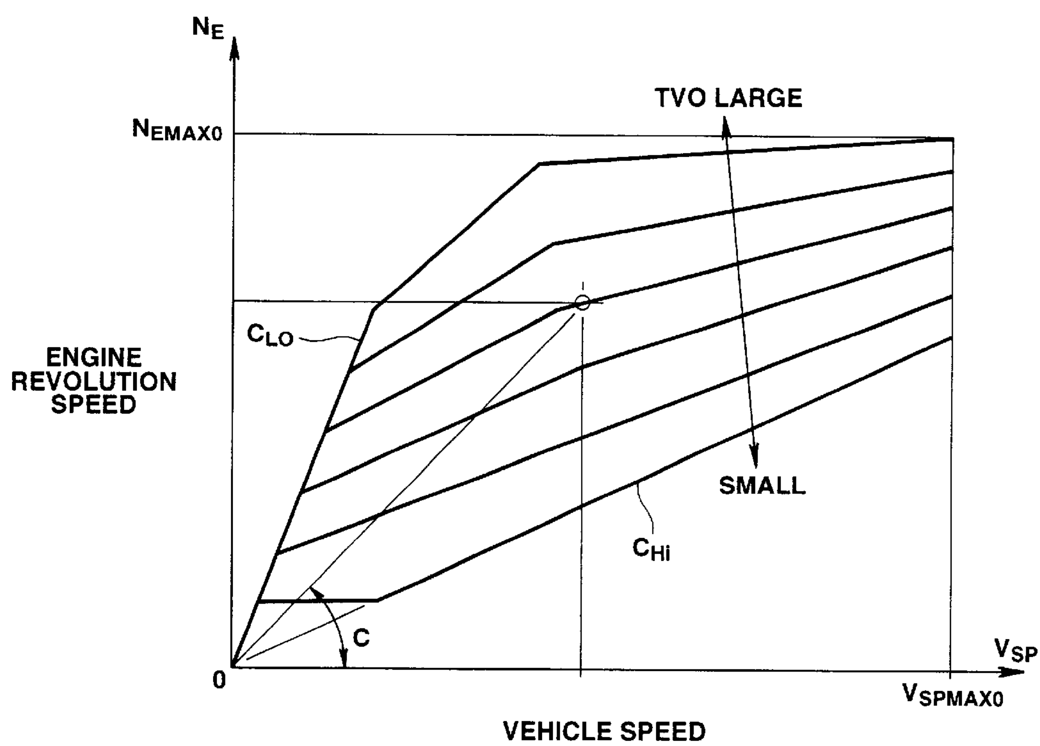
FIG. 6 is a graph showing a control map for setting a transmission ratio from the throttle opening and the vehicle speed.

At a step S6, the microcomputer 310 calculates a goal transmission ratio $C_D$ by executing an independently provided process (subroutine) such as the retrieval of a control map. The goal transmission ratio $C_D$ is the most ideal transmission ratio for achieving the present engine revolution speed $N_S$ from the vehicle speed and the throttle opening TVO. More particularly, as shown in FIG. 6, if a transmission ratio C, by which the vehicle speed $V_{SP}$, the throttle opening TVO and the engine revolution speed $N_S$ are completely matched, is set, it is possible to ensure an acceleration according to the depression degree of the accelerator pedal (the throttle opening TVO) while satisfying the vehicle speed $V_{SP}$ and the engine revolution speed $N_S$. Herein, if it is assumed that the map shown in FIG. 6 is the control map for setting the goal transmission ratio $C_P$, a straight line crossing with an origin point and having a constant gradient is a constant transmission ratio. For example, a straight line having the largest gradient in the whole area of the shift pattern is the largest speed reduction ratio of the vehicle, that is, a maximum transmission ratio $C_{LO}$. In reverse, a straight line having the smallest gradient in the whole area of the shaft pattern is the smallest speed reduction ratio of the vehicle, that is, a minimum transmission ratio $C_{0H1}$. Herein, if the 2-range is selected through the select lever 103, the shift control is implemented within an area from the maximum transmission ratio $C_{LO}$ to a 2-range minimum transmission ratio $C_{2H1}$.

At a step S7, the microcomputer 310 calculates the objective transmission ratio $C_R$ according to an individually prepared process (subroutine). More particularly, when the goal transmission ratio $C_D$ is greater than the present transmission ratio $C_P$, the objective transmission ratio $C_R$ is set to execute the downshift. When smaller than the present transmission ratio $C_P$, the objective transmission ratio $C_R$ is set to execute the upshift. For example, the objective transmission ratio $C_R$ is set at a transmission ratio obtained at a moment elapsing a predetermined sampling time $\Delta T$ from when the shifting is executed from the present transmission ratio $C_P$ by the highest shift speed $dC_R/dt$ or smallest time constant $\tau$. Herein, if the throttle opening TVO is decreased from a nearly full open state, that is, when the depression degree of the accelerator pedal is decreased, the shift speed $dC_R/dt$ is little decreased or the time constant $\tau$ is little increased. Further, when the throttle opening TVO is further quickly decreased, such that the depression of the accelerator pedal is cancelled, the shift speed $dC_R/dt$ is further decreased or the time constant $\tau$ is further increased. That is to say, the objective transmission ratio $C_R$ is changed according to the closing change amount of the throttle valve 19.

in this embodiment, the time constant $\tau$ is employed in order to set the objective transmission ratio $C_R$, that is, to control the shift speed. Therefore, when the goal transmission ratio $C_D$ is set, the objective transmission ratio $C_R$ is determined as a curve which takes values gradually converging to the goal transmission ratio $C_D$.

At a step S8, the microcomputer 310 executes a clutch engagement control according to an individually provided process (subroutine). More particularly, as a basic manner, when the vehicle speed $V_{SP}$ is greater than a creep control threshold, the forward clutch 40 is engaged. When the vehicle speed $V_{SP}$ is smaller than the creep control threshold and when the throttle opening TVO is greater than a creep control full close threshold, the engagement of the forward clutch 40 is released. Such operations are executed by generating and outputting the corresponding signal $S_{CL}$ from the microcomputer 310 to the fourth drive circuit 314. When the vehicle speed $V_{SP}$ is smaller that the creep control threshold and when the throttle opening TVO is smaller than the full close threshold, the gain for changing the duty ratio $D/T_{CL}$ is changed in inverse proportion to the difference between the engine revolution speed $N_E$ and the input rotation speed $N_{Pri}$ (turbine output shaft rotation speed). By this arrangement, the engagement force of the clutch 40 is decreased if the vehicle tends to generate a creep running due to a road condition such as a up-slope road running condition, and the engagement force of the clutch 40 is increased if the vehicle does not tend to genarate a creep running.

At a step S9, the microcomputer 310 executes a transmission ratio control according to an individually prepared process (subroutine). More particularly, with respect to the objective transmission ratio $C_R$ the total number of the pulses and the number of pulses per a unit time are determined. Then, the microcomputer 310 generates and outputs the pulse control signal $S_{S/M}$ satisfying the both numbers. After the execution of the step S9, the routine of this program returns to the main program.

Next, the line pressure control executed at the step S4 of the flowchart of FIG. 3 will be discussed in detail with reference to the flowchart of FIG. 7.

At a step S401, the microcomputer 310 calculates a torque ratio t of the torque converter 12 from the speed ratio $N_E/N_{Pri}$ by executing the individually provided calculation such as the retrieval of the control map. More particularly, the torque converter input and output speed ratio $N_E/N_{Pri}$ is obtained by dividing the engine revolution speed $N_E$ by the input rotation speed $N_{Pri}$ equal to the turbine output rotation speed. The microcomputer 310 determines according to the torque converter input and output speed ratio $N_E/N_{Pri}$ and the map of FIG. 8 whether the torque converter 12 is put in the unlockup (converter) state or the lockup state. Further, the microcomputer 310 computes the torque ratio t according to the torque converter input and output speed ratio and the map of FIG. 8 if the unlock state.

At a step S402, the microcomputer 310 calculates an input torque $T_{Pri}$ by multiplying the torque ratio t by the engine torque $T_E$.

Figure 9:
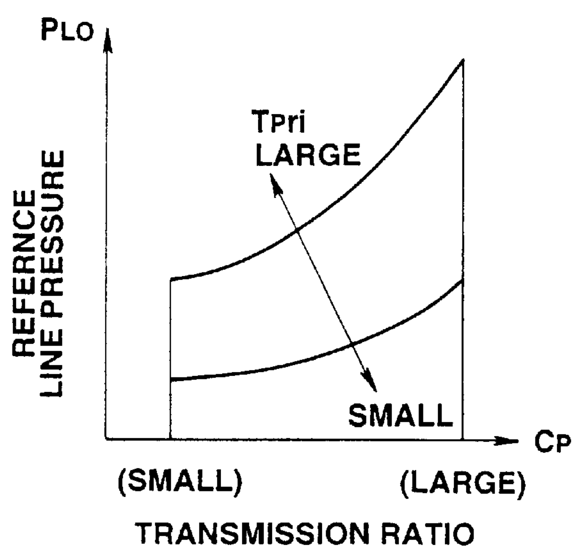
FIG. 9 is a graph showing a control map for setting a reference pressure from an input torque and the transmission ratio.

At a step S493, the microcomputer 310 calculates a reference line pressure $P_{L0}$ on the basis of the input torque $T_{Pri}$ and a control map of FIG. 9. That is, the reference line pressure $P_{L0}$ is read from the control map of FIG. 9 according to the present transmission ratio $C_P$ upon treating the input torque $T_{Pri}$ as a parameter. Since the line pressure $P_L$ corresponds to the belt holding force, it is preferable to possibly keep the line pressure $P_L$ small in view of the durability of the belt 24 and the energy efficiency of the CVT. On the other hand, since the belt 24 is required to transmit the torque between the driver and follower pulleys 16 and 26, it is necessary to control the line pressure $P_L$ so as to prevent the belt from slipping from the pulleys. That is, it is necessary to apply a necessary line pressure to the pulleys 16 and 26 to hold the belt 25 thereby. Since the torque to be transmitted by the CVT is increased according to the increase of the transmission ratio $C_P$ or the increase of the input torque $T_{Pri}$, it is necessary to increase the line pressure $P_L$ according to the increase of the transmission ratio $C_P$ or the input torque $T_{Pri}$. In order to comply with the above-mentioned requirement, the reference line pressure $P_{L0}$ is set only by the transmission ratio $C_R$ and the input torque $T_{Pri}$. The reference line pressure $P_{L0}$ takes a value which is much smaller than a value which directly affecting the durability of the belt 24.

At a step S404, the microcomputer 310 calculates an output rotation speed $N_{Sec}$ by dividing the vehicle speed $V_{SP}$ by a final reduction ratio n ($N_{Sec}=V_{SP}/n$.

At a step S405, the microcomputer 310 calculates a follower pulley centrifugal pressure $P_{L1}$ by multiplying a predetermined coefficient k with a square $(N_{Sec})^2$ of the output rotation speed $N_{Sec}$ ($P_{L1}=k\cdot(N_{Sec})^2$). When the working fluid in the cylinder chamber 32 of the follower pulley 26 is pushed toward an outer side in the cylinder chamber 32 by the centrifugal force, the pressure of the working fluid at the outer side in the chamber 32 is increased. Such an increased pressure due to the centrifugal force is defined as the centrifugal pressure $P_{L1}$ in this embodiment. Since the centrifugal pressure $P_{L2}$ is in proportion with the square $(N_{Sec})^2$ of the output rotation speed as is similar to the centrifugal force, it is derived by multiplying the square $(N_{Sec})^2$ by the proportion coefficient k which is determined upon taking account of the properties of the working fluid such as specific gravity and viscosity.

At a step S406, the microcomputer 310 determines a difference between the reference line pressure $P_{L0}$ and the centrifugal pressure $P_{L1}$ as an objective line pressure $P_{L0R}$ ($P_{L0R}=P_{L0}-P_{L1}$).

Figure 2:
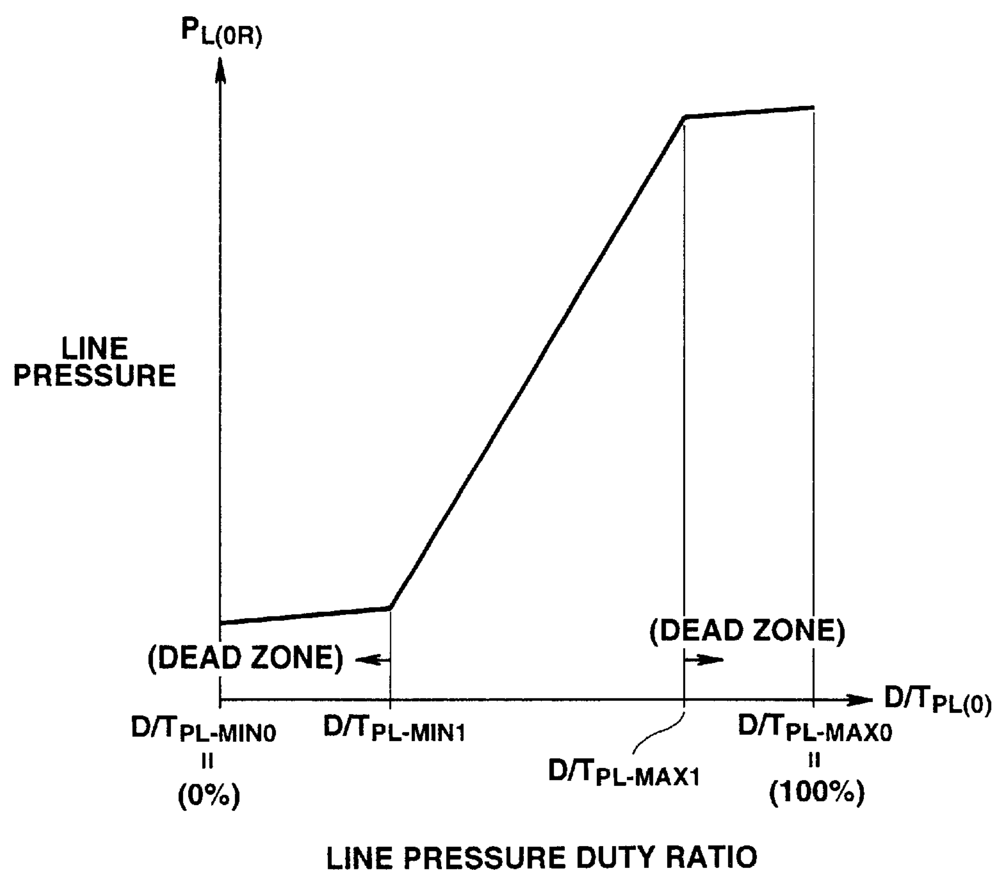
FIG. 2 is a graph showing a control map for setting a duty ratio of a duty valve for controlling a line pressure according to an objective line pressure.

At a step S407, the microcomputer 310 calculates a reference line pressure control duty ratio $D/T_{PL0}$ for achieving the objective line pressure $P_{L0R}$, from a control map shown in FIG. 2. A conventional duty ratio control The control map for determining the reference line pressure control duty ratio $D/T_{PL0}$ may be applied to the control map used in this step.

At a step S408, the microcomputer 310 determines whether or not the engine revolution speed $N_E$ is greater than or equal to a preset switching control value $N_{E0}$ or not. When the determination at the step S408 is affirmative ($N_E \geqq N_{E0}$), the routine proceeds to a step S409. When it is negative ($N_E<N_{E0}$), the routine proceeds to a step S410.

At the step S410, the microcomputer 310 determines whether or not the vehicle speed $V_{SP}$ is smaller than the switching control value $V_{SP0}$. When the determination at the step S410 is affirmative ($V_{SP}<V_{SP0}$), the routine proceeds to a step S411. When the determination at the step S410 is negative ($V_{SP} \geqq V_{SP0}$), the routine proceeds to the step 5409. The explanation of the switching control values $N_{E0}$ and $V_{SP0}$ will be given later.

At the step S409, the microcomputer 310 stores the minimum value $D/T_{PL-MIN0}$ as a duty ratio lower limit $D/T_{PL-MIN}$. Then, the routine proceeds to a step S412.

At the step S411, the microcomputer 310 stores the lower dead zone threshold $D/T_{PL-MIN1}$ as the duty ratio lower limit $D/T_{PL-MIN}$. Then, the routine proceeds to the step S412.

At the Stop S412, the microcomputer 310 determines whether or not the reference line pressure duty ratio $D/T_{PL0}$ is greater than or equal to the duty ratio lower limit $D/T_{PL-MIN}$. When the determination at the step S412 is affirmative ($D/T_{PL0} \geqq D/T_{PL-MIN}$), the routine proceeds to a step S413. When the determination at the step S412 is negative ($D/T_{PL0} < D/T_{PL-MIN}$), the routine proceeds to a step 414.

At the step S413, the microcomputer 310 stores the reference line pressure duty ratio $D/T_{PL0}$ as the line pressure control duty ration $D/T_{PL}$.

At the step S414, the microcomputer 310 stores the duty ratio lower limit $D/T_{PL-MIN}$ as the line pressure control duty ration $D/T_{PL}$.

Following to the execution of the step S413 or S414, the routine proceeds to a step S415 wherein the microcomputer 310 generates and outputs the line pressure control signal $S_{PL}$ according to the line pressure control duty ration $D/T_{PL}$.

Figure 3:
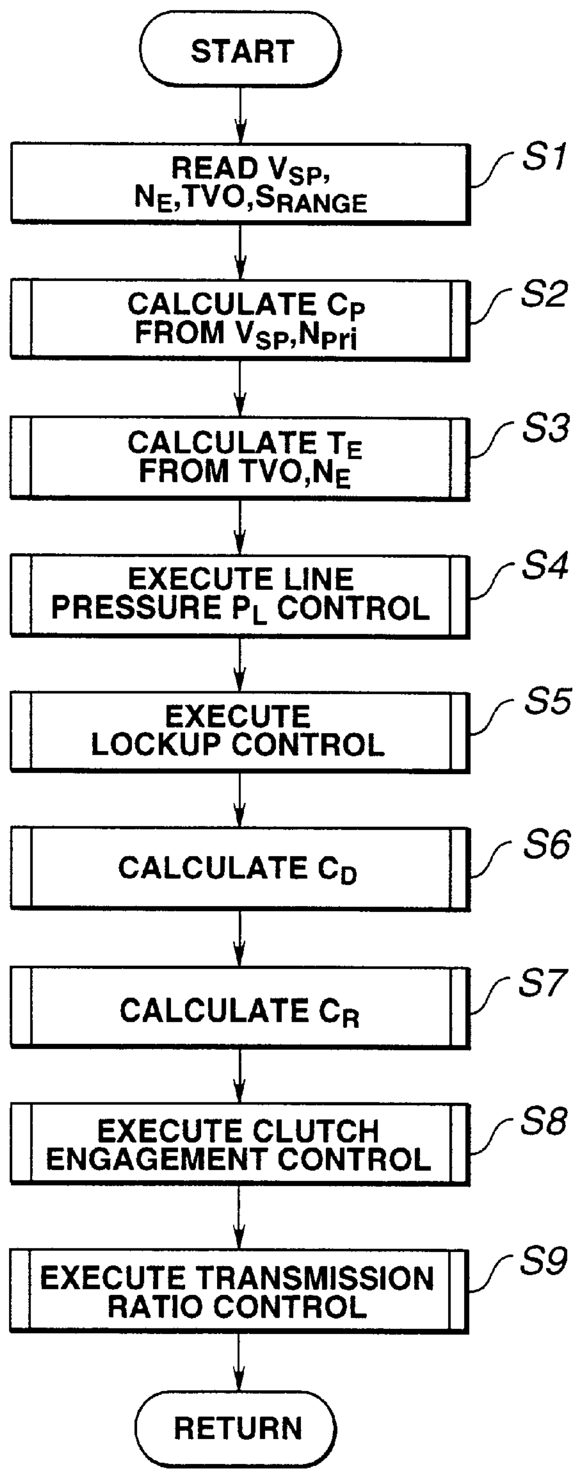
FIG. 3 is a flowchart showing a program executed by a transmission control unit of FIG. 1.
Figure 4:
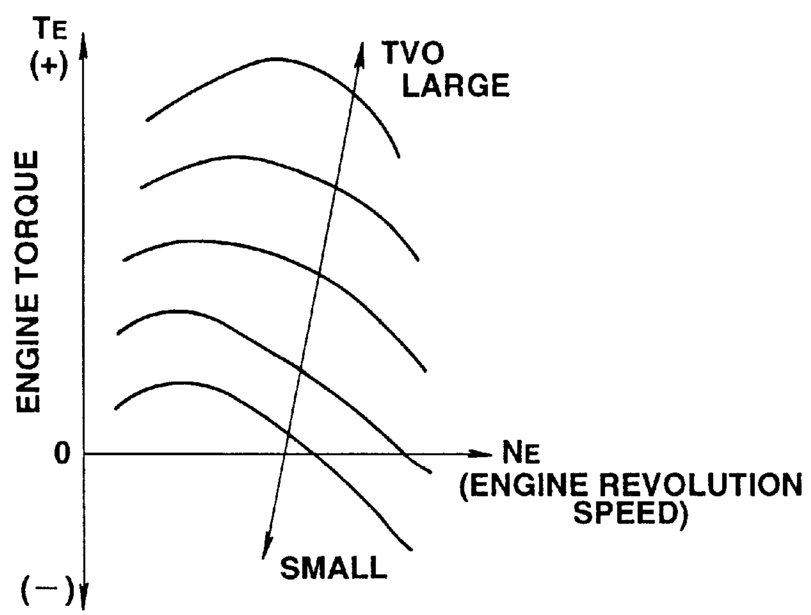
FIG. 4 is a graph showing a control map for setting an engine torque from an throttle opening and an engine revolution speed.
Figure 5:
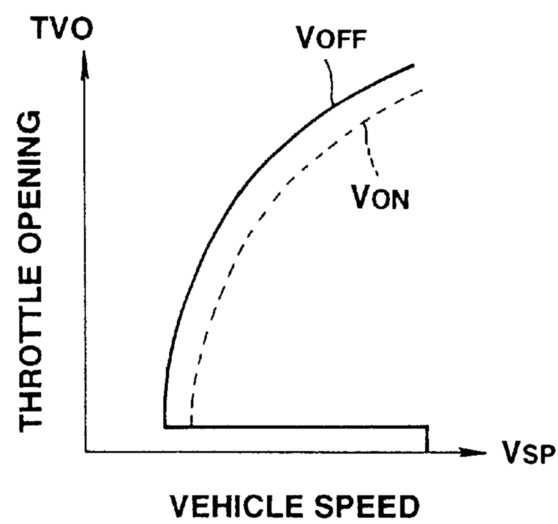
FIG. 5 is a graph showing a control map for setting a lockup vehicle speed and an unlockup vehicle speed from the vehicle speed and the throttle opening.

After the execution of the step S415, the routine returns to the step S5 of FIG. 3. Herein, the generation of the line pressure control signal $S_{PL}$ corresponding to the line pressure duty ratio $D/T_{PL}$ may employ a known PWM (Pulse Width Modulation) control, and therefore the explanation thereof will be omitted herein.

The function or the processing of FIG. 7 will be discussed in detail.

By the execution of the steps S401 to S403, the reference line pressure $P_{L0}$ is determined according to the input torque $T_{Pri}$ to the CVT mechanism 29. The reference line pressure $P_{L0}$ is a necessary pressure for holding the belt against the input torque $T_{Pri}$ to be transmitted.

By the execution of the steps S404 and S405, the ceintrifugal pressure $P_{L1}$ calculated from the square of the output rotation speed $N_{Sec}$.

By the execution of the step S406, the objective line pressure $P_{L0R}$ to be generated by the CVT mechanism pressure control valve including the line pressure control duty valve 120 is obtained by subtracting the centrifugal pressure $P_{L1}$ from the reference line pressure $P_{L0}$.

By the execution of the step S407, the reference line pressure duty ratio $D/T_{PL0}$ necessary to achieve the objective line pressure $P_{L0R}$ is set.

By the execution of the steps S408 to S411, the duty ratio lower limit is determined. That is, when the engine revolution speed $N_E$ is greater than or equal to the switching control value $N_{E0}$ or when the vehicle speed $V_{SP}$ is greater than or equal to the switching control value $V_{SP0}$, the minimum value $D/T_{PL-MIN0}$ is treated as the duty ratio lower limit $D/T_{PL-MIN}$. When the engine revolution speed $N_E$ is smaller than the switching control value $N_{E0}$ and when the vehicle speed $V_{SP}$ is smaller than the switching control value $V_{SP0}$, the lower dead zone threshold $D/T_{PL-MIN1}$ is treated as the duty ratio lower limit $D/T_{PL-MIN}$.

By the execution of the steps S412 to S414, the line pressure duty ratio is determined. That is, when the reference line pressure duty ratio $D/T_{PL0}$ is greater than or equal to the duty ratio lower limit $D/T_{PL-MIN}$, the reference line pressure duty ratio $D/T_{PL0}$ is used as the line pressure duty ratio $D/T_{PL}$. When the reference line pressure duty ratio $D/T_{PL0}$ is smaller than the duty ratio lower limit $D/T_{PL-MIN}$, the duty ratio lower limit $D/T_{PL-MIN}$ is used as the line pressure duty ratio $D/T_{PL}$.

On the basis of the determined line pressure duty ratio $D/T_{PL}$, the line pressure control signal $S_{PL}$ is generated and outputted. That is to say, by the execution of the steps S408 to S414, a selecting control of the duty ratio lower limit $D/T_{PL}$ is executed. More particularly, when the engine revolution speed $N_E$ is high or when the vehicle speed $V_{SP}$ is high, the duty ratio lower limit $D/T_{PL-MIN}$ functioning as a limit value for finally limiting the line pressure duty ratio $D/T_{PL}$ is switched from the lower dead zone threshold $D/T_{PL-MIN1}$ to the minimum value $D/T_{PL-MIN0}$ (duty ratio=0%).

The explanation of the switching control values $N_{E0}$ and $V_{SP0}$ will be given hereinafter.

Figure 10:
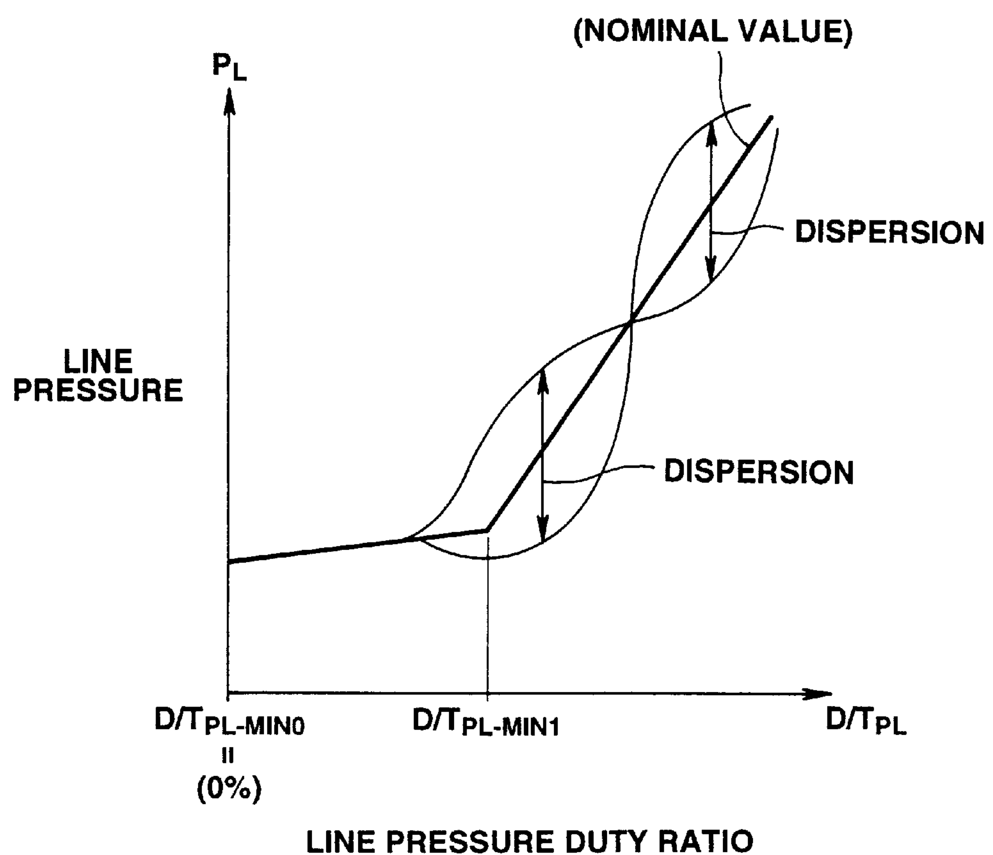
FIG. 10 is a graph for explaining the dispersion of the line pressure generated with respect to the line pressure duty ratio.
Figure 11:
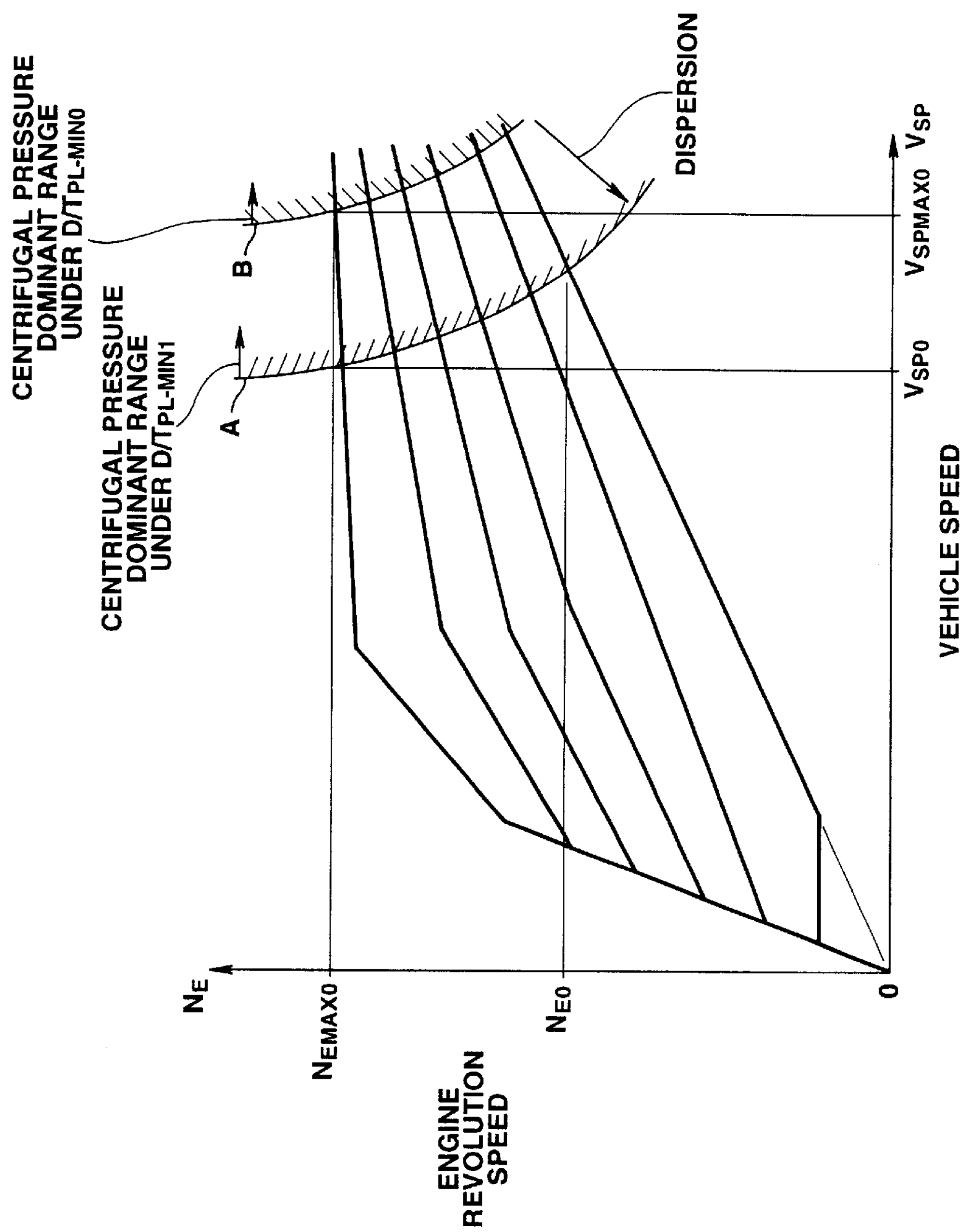
FIG. 11 is a graph for explaining an expansion of a transmission ratio control range according to the present invention.

The characteristic curve between the duty ratio and the line pressure output shown in FIG. 2 is a nominal characteristic for a control valve constituted by a common duty valve. Practically, the characteristic curve therebetween is represented as shown in FIG. 10 with a large dispersion such that the line pressure $P_L$ is vertically fluctuated with respect to the line pressure duty ratio $D/T_{PL}$ within a range including the ON-OFF boundary of the line pressure control duty valve 120. This width of the fluctuation represents the dispersion of the output pressure of the working fluid. However, this dispersion is almost decreased to zero when the duty ratio $D/T_{PL}$ under the OFF condition is set at the minimum value $D/T_{PL-MIN0}$ (=0%). Because the line pressure control duty valve 120 receiving the minimum value $D/T_{PL-MIN0}$ (=0%) is put in a full close (or full open) state in that the line pressure control duty valve 120 receives no affection of the voltage of the duty ratio control signal, the temperature of the working fluid and babbles in the fluid.

When the line pressure control duty valve 120 is controlled to slightly change its state from the OFF state to the ON state, a spool or puppet of the valve 120 is put in a reciprocating state or floating state in the working fluid. Under this state of the valve 120, the various factors of the fluctuation such as the voltage of the duty ratio control signal, the temperature of the working fluid and babbles in the fluid affect the output pressure of the valve 120 to produce the dispersion by each valve. The line pressure $P_L$ of the CVT mechanism 29 changes with a large gain and widely ranges from the minimum value to the maximum value. Therefore, the width of the dispersion of the line pressure $P_L$ is represented largely as shown in FIG. 10.

On the other hand, all actual line pressure $P_L$ of a control valve including this kind of a duty valve is almost not changed within a dead zone smaller than the lower dead zone threshold $D/T_{PL-MIN1}$. Therefore, when the line pressure $P_L$ is quickly and largely increased from the minimum value of a dead-zone value, the line pressure $P_L$ tends to be short with respected to an objective value (to produce an undershoot of the line pressure). Such an undershoot will cause the degradation of the responsibility of the line pressure control. Therefore, the embodiment of the present invention is arranged such that the lower dead zone threshold $D/T_{PL-MIN1}$ is used as the line pressure duty ratio lower limit $D/T_{PL-MIN}$ when the engine revolution speed $N_E$ is not high and when the vehicle speed $V_{SP}$ is not high, so as to prevent the line pressure duty ratio $D/T_{PL}$ functioning as a command value from taking a value smaller than the duty ratio corresponding to the lower dead zone threshold $D/T_{PL-MIN1}$. This arrangement ensures the responsibility of the line pressure control. That is, the lower dead zone threshold $D/T_{PL-MIN1}$ is set as the command value which is a limit value attaching importance to the responsibility with respect to the line pressure duty ratio $D/T_{PL}$.

The centrifugal pressure $P_L$ is increased according to the increase of the rotation speed of the follower pulley 26. When the rotation speed of the follower pulley 26 becomes greater than a predetermined value, the pulleys holds the belt 24 so as to be able to transmit the maximum input torque from the engine regardless the magnitude of the line pressure $P_L$. Under this holding state, it is impossible to quickly and properly execute the transmission ratio control.

Accordingly, such a centrifugal pressure dominant range of the line pressure is to be omitted from the transmission control range. The range to be omitted from the transmission ratio control range is a range where the input load is transmitted only by the holding force due to the centrifugal pressure under a condition that the line pressure $P_L$ is zero, that is, the line pressure duty ratio $D/T_{PL}$ is the minimum value $D/T_{PL-MIN0}$ (=0%). This centrifugal pressure dominant range is shown by a hatching area B in FIG. 11. in FIG. 11, the maximum value $N_{EMAX0}$ is the maximum value of the engine revolution speed $N_E$ within the transmission ratio control range except for the centrifugal pressure dominant range. Further, when the engine revolution speed $N_E$ is the maximum value $N_{EMAX0}$, the vehicle speed $V_{SP}$ takes a vehicle speed maximum value $V_{SPMAX0}$. In this embodiment, the transmission ratio control range is limited within a range excepting the vehicle speed maximum value $V_{SPMAX0}$ corresponding to the engine speed maximum value $N_{EMAX0}$.

However, if the line pressure lower limit $D/T_{PL-MIN}$ is kept at the lower dead zone threshold $D/T_{PL-MIN1}$, the range to be omitted from the transmission ratio control range should be set upon taking account of the dispersion amount of the line pressure in addition to the centrifugal pressure $P_{L1}$. Therefore, this centrifugal pressure dominant range takes a hatching area A in FIG. 11. As a result, the controllable area of the transmission ratio is decreased. However, when the engine revolution speed $N_E$ is greater than a predetermined value or when the vehicle speed $V_{SP}$ is greater than a predetermined value, the follower pulley 24 is rotated in high speed and therefore the centrifugal pressure is high according to tho high rotation speed of the follow pulley 26. Accordingly, under such condition even if the responsibility of the line pressure control is improved by setting the line pressure duty ratio lower limit at the minimum valnle $D/T_{PL-MIN1}$ (in order to respond to the condition that the line pressure duty ratio $D/T_{PL}$ is small, that is, the line pressure $P_L$ is small), such improvement does not effectively function. Therefore, when the vehicle operating condition is put in the range A of FIG. 11, the line pressure duty ratio lower limit $D/T_{PL-MIN}$ is switched to the minimum value $D/T_{PL-MIN0}$ (=0%) so as to extend the transmission ratio control range to the boundary defined by the engine revolution speed maximum value $N_{EMX0}$ and the vehicle speed maximum, value $V_{SPMAX0}$. More particularly, when the engine revolution speed $N_E$ is greater than or equal to the switching control value $N_{E0}$ or when the vehicle speed $V_{SP}$ is greater than or equal to the switching control value $V_{SPMAX0}$, the transmission ratio controllable range is extended to the boundary of the range B of FIG. 11. In view of the durability of the belt 24, it is effective to eliminate the dispersion of the line pressure $P_L$ due to the lower dead zone threshold $D/T_{PL-MIN1}$ under the high engine revolution state or high vehicle speed state.

Within the range A, the belt 24 is rotated in high speed and receives a large centrifugal pressure. If a large axial load due to the line pressure PL is applied to the belt 24 under the high centrifugal force receiving condition, the belt 24 may slip or be stretched so as affect the durability of the belt 24. Therefore, by setting the line pressure duty ratio lower limit $D/T_{PL-MIN}$ at the minimum value $D/T_{PL-MIN0}$, it is possible to eliminate the dispersion corresponding to added amount of the centrifugal pressure $P_{L1}$. This eliminated amount contributes to improve the durability of the belt 24.

The line pressure duty valve 120 constitutes a CVT mechanism control valve according to the present invention. The steps S408 and S410 of the flowchart of FIG. 7 constitute a centrifugal pressure detecting means. The steps S409 and S411 of FIG. 7 constitute a switching means.

The contents of Application No. TOKUGANHEI 9-191263, with a filing date Jul. 16, 1997 in Japan, are hereby incorporated by reference.

Although the preferred embodiment according to the present invention has been shown and described such that it is determined that the centrifugal pressure $P_{L1}$ is high enough to transmit the input load by determining whether or not the engine revolution speed $N_E$ is high, or whether or not the vehicle speed $V_{SP}$ is high, it will be understood that if a means for directly detecting the centrifugal pressure $P_{L1}$ is installed in the control system, the above-mentioned determination will be further easily executed.

Although the preferred embodiment has been shown and described such that the control unit thereof is constituted by a microcomputer, it will be understood that a combination of electronic circuits such as calculating circuits may be employed in the control unit instead of the microcomputer.

What is claimed is:

1. A control system comprising:

a continuously variable transmission (CVT) comprising a driver pulley, a follower pulley and a belt intercoupling the pulleys, said, CVT varying a transmission ratio by changing effective diameters of the pulleys;

a CVT pressure control valve controlling a pressure of working fluid to be supplied to said CVT according to a command signal;

a centrifugal pressure detecting means for detecting a centrifugal pressure of the working fluid in the pulley;

a centrifugal pressure deciding means for deciding that the centrifugal pressure is in a centrifugal pressure dominant range in which motive power is transmitted only by the centrifugal pressure; and a limit value switching means to switching a limit value of the command signal from a high response value to a high stability value when the centrifugal pressure is in the centrifugal pressure dominant range.

2. A control system as claimed in, claim 1, wherein said CVT pressure control valve includes a duty valve to which the command signal corresponding to a duty ratio indicative signal is applied, wherein the high response value is a lower dead zone threshold value of an output characteristic of the duty valve, and the high stability value is a minimum value of a a duty ratio of the duty valve.

3. A control system as claimed in claim 1, wherein said centrifugal pressure detecting means includes a calculating means for calculating the centrifugal pressure from a follower pulley rotation speed.

4. A control system as claimed in claim 1, wherein said CVT pressure control valve includes a duty valve to which the command signal corresponding to the duty ratio indicative signal is applied, wherein the high response value is one of lower and upper dead zone threshold values of an output characteristic of the duty valve, and the high stability value is one of a minimum value and a maximum value of the duty ratio of the duty valve.

5. A control system as claimed in claim 1, wherein the command signal applied to said CVT pressure control valve is calculated according to an objective line pressure obtained by subtracting the centrifugal pressure from an reference line pressure.

6. A control system as claimed in claim 5, wherein the reference line pressure is calculated from the input torque and a transmission ratio said CVT.

7. A control system as claimed in claim 6, wherein the reference line pressure is calculated on the basis of a predetermined map showing a relationship of the reference pressure to the input torque and the transmission ratio.

8. A control system as claimed in claim 1, wherein said controller includes a microcomputer which stores a plurality of control maps for computing parameters indicative of vehicle operating condition.

9. A control system as claimed in claim 8, wherein the microcomputer outputs the command signal to said CVT pressure control value.

10. A control system of a continuously variable transmission (CVT), the CVT comprising a driver pulley, a follower pulley and a belt intercoupling the pulleys and constituting a drive system with an engine, the control system comprising:

a vehicle speed sensor detecting a vehicle speed of a vehicle equipped with said CVT;

a driver pulley rotation speed sensor detecting a rotation speed of the driver pulley;

a centrifugal pressure detecting means for detecting a centrifugal pressure;

a line pressure control duty valve varying a line pressure applied to the CVT according to a command signal; and a controller arranged to perform determining that the centrifugal pressure is greater than a value enough to transmit an input load from the engine to the CVT, and to perform switching a limit value of the command signal from a high-response value to a high-stability value when the centrifugal pressure is greater than the value.

11. A control system comprising:

a continuously variable transmission (CVT), the CVT comprising a driver pulley, a follower pulley and a belt connecting the pulleys and constituting a drive system with an engine;

a vehicle speed sensor detecting a vehicle speed of a vehicle equipped with said CVT;

a driver pulley rotation speed sensor detecting a rotation speed of the driver pulley;

a line pressure control duty valve varying a line pressure applied to said CVT according to a command signal; and a controller arranged to calculate a follower pulley rotation speed on the basis of the vehicle speed and the driver pulley rotation speed, to calculate the centrifugal pressure of the follower pulley on the basis of the calculated follower pulley rotation speed, to determine that the centrifugal pressure is greater than a value enough to transmit load of the engine, and to switch a limit value of the command signal from a high-response value to a high-stabillity value when the centrifugal pressure is greater than the value.

12. A control system of a continuously variable transmission (CVT), the CVT comprising a driver pulley, a follower pulley and a belt connecting the pulleys, the control system comprising:

an engine revolution speed sensor detecting a revolution speed of an engine connected to the driver pulley;

a vehicle speed sensor detecting a vehicle speed of a vehicle equipped with the engine and the CVT;

a line pressure control duty valve varying a line pressure applied to the CVT according to a duty ratio; and a controller arranged to perform varying the duty ratio within one of an intermediate linear characteristic range and a whole range including upper and lower dead zones in addition to the intermediate linear characteristic range, to perform determining that the engine revolution speed is higher than a predetermined switching revolution speed, to perform determining that the vehicle speed is higher than a predetermined switching vehicle speed, and to perform selecting the whole range when the engine revolution speed is higher than the predetermined switching revolution speed or when the vehicle speed is higher than the predetermined switching vehicle speed.

13. A continuously variable transmission comprising:

a driver pulley receiving an input power from an engine;

a follower pulley outputting an output power upon transforming the input power in rotation speed and torque;

a belt connecting said driver and follower pulleys;

an engine revolution speed sensor detecting a revolution speed of the engine;

a vehicle speed sensor detecting a vehicle speed of a vehicle equipped with the engine and the CVT;

a line pressure control duty valve varying the line pressure applied to said pulleys according to a duty ratio; and a controller arranged to perform varying the duty ratio within one of an intermediate linear characteristic range and a whole range including upper and lower dead zones in addition to the intermediate linear characteristic range, to perform determining that the engine revolution speed is higher than a predetermined switching revolution speed, to perform determining that the vehicle speed is higher than a predetermined switching vehicle speed, and to perform selecting the whole range when the engine revolution speed is higher than the predetermined switching revolution speed or when the vehicle speed is higher than the predetermined switching vehicle speed.

* * * * *